United States Patent
Jones et al.

(10) Patent No.: US 8,695,915 B1
(45) Date of Patent: Apr. 15, 2014

(54) FLAP SIDE EDGE LINERS FOR AIRFRAME NOISE REDUCTION

(75) Inventors: Michael G. Jones, Newport News, VA (US); Mehdi R. Khorrami, Norfolk, VA (US); Meelan M. Choudhari, Yorktown, VA (US); Brian M. Howerton, Newport News, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 141 days.

(21) Appl. No.: 13/417,347

(22) Filed: Mar. 12, 2012

Related U.S. Application Data (60) Provisional application No. 61/451,727, filed on Mar. 11, 2011, provisional application No. 61/597,282, filed on Feb. 10, 2012, provisional application No. 61/451,730, filed on Mar. 11, 2011, provisional application No. 61/451,735, filed on Mar. 11, 2011.

(51) Int. Cl.
*B64C 1/40* (2006.01)
*B64C 23/00* (2006.01)

(52) U.S. Cl.
USPC .......................................... 244/1 N; 244/200

(58) Field of Classification Search
USPC ................ 244/1 N, 200, 200.1, 123.1, 199.4; 415/119; 416/231 R
See application file for complete search history.

(56) References Cited

U.S. PATENT DOCUMENTS

| | | | | |
|---|---|---|---|---|
| 3,612,446 | A * | 10/1971 | Lebert | 244/35 R |
| 3,779,338 | A * | 12/1973 | Hayden et al. | 181/296 |
| 3,821,999 | A * | 7/1974 | Guess et al. | 181/296 |
| 3,853,428 | A * | 12/1974 | Hayden et al. | 416/231 R |
| 4,240,250 | A | 12/1980 | Harris | |
| 6,454,219 | B1 | 9/2002 | Moe | |
| 6,948,906 | B2 * | 9/2005 | Leishman et al. | 415/119 |
| 7,484,930 | B2 * | 2/2009 | Hutcheson et al. | 415/119 |
| 7,637,462 | B2 * | 12/2009 | Pal | 244/199.2 |
| 8,033,510 | B2 * | 10/2011 | Shmilovich et al. | 244/208 |
| 8,056,850 | B2 | 11/2011 | Lin et al. | |
| 8,096,513 | B2 * | 1/2012 | Mau et al. | 244/199.2 |
| 2004/0197194 | A1 * | 10/2004 | Leishman et al. | 416/232 |
| 2007/0020099 | A1 * | 1/2007 | Hutcheson et al. | 416/90 R |
| 2009/0084905 | A1 * | 4/2009 | Mau et al. | 244/207 |
| 2010/0294883 | A1 * | 11/2010 | Trich s et al. | 244/1 N |

OTHER PUBLICATIONS

D. Angland, et al., "Measurements of Flow around a Flap Side-Edge with Porous Edge Treatment," AIAA 2006-213, 44th AIAA Aerospace Sciences Meeting and Exhibit, Jan. 9-12, 2006, pp. 1-22, Reno, Nevada.

D. Angland, et al., "Measurements of Flow around a Flap Side Edge with Porous Edge Treatment," AIAA Journal, Jul. 7, 2009, pp. 1660-1671, vol. 47, No. 7.

(Continued)

*Primary Examiner* — Philip J Bonzell
(74) *Attorney, Agent, or Firm* — Andrea Z. Warmbier (57) ABSTRACT

One or more acoustic liners comprising internal chambers or passageways that absorb energy from a noise source on the aircraft are disclosed. The acoustic liners may be positioned at the ends of flaps of an aircraft wing to provide broadband noise absorption and/or dampen the noise producing unsteady flow features, and to reduce the amount of noise generated due to unsteady flow at the inboard and/or outboard end edges of a flap.

20 Claims, 5 Drawing Sheets

(56) References Cited

OTHER PUBLICATIONS

Tony L. Parrott, et al., "Paraliel-element liner impedances for improved absorption of broadband sound in ducts," Noise Control Engineering Journal, Nov.-Dec. 1995, pp. 183-195, vol. 43(6).

L. S. Wirt, "Analysis, Testing, and Design of Lined Ducts." The Journal of the Acoustical Society of America, May 1972, pp. 1448-1463, vol. 51(5), Part 1.

Tony L Parrott, et al., "Effect of Resonator Axis Skew on Normal Incidence Impendance," AIAA 2003-3307, 9th AIAA/CEAS Aeroacoustics Conference, May 12-14, 2003, pp. 1-8, Hilton Head, South Carolina.

Brian M. Howerton, et al., "Validation of an Acoustic Impendance Prediction Model for Skewed Resonators," AIAA 2009-3143, May 2009, pp. 1-21.

M. G. Jones, et al., "Assessment of Soft Vane and Metal Foam Engine Noise Reduction Concepts." AIAA 2009-3142, May 2009, pp. 1-20.

Mehdi R. Khorrami, et al., "Application of Passive Porous Treatment to Slat Trailing Edge Noise," NASA/TM-2003-212416, May 2003, pp. 1-14.

Mehdi R. Krorrami, et al., "Novel Approach for Reducing Rotor Tip-Clearance-Induced Noise in Turbofan Engines," AIAA Journal, Aug. 2002, pp. 1518-1528, vol. 40, No. 8.

Meelan Choudhari, et al., "Computational Study of Porous Treatment for Altering Flap Side-Edge Flowfieid," AIAA 2003-3113, 9th AIAA/CEAS Aeroacoustics Conference, May 12-14, 2003, pp. 1-15. Hilton Head, South Carolina.

W. Clifton Horne, et al., "Measurements of 26%-scale 777 Airframe Noise in the NASA Ames 40-by 80 Foot Wind Tunnel," AIAA, 2005-2810, 11th AIAA/CEAS Aeroacoustics Conference (26th AIAA Aeroacoustics Conference), May 23-25, 2005, pp. 1-19, Monterey, California.

* cited by examiner

FLAP SIDE EDGE LINERS FOR AIRFRAME NOISE REDUCTION

CROSS-REFERENCE TO RELATED APPLICATIONS

This application is related to co-pending U.S. patent application Ser. Nos. 13/417,349 and 13/417,351 filed on Mar. 12, 2012. This application claims the benefits of U.S. Provisional Application No. 61/451,727, filed on Mar. 11, 2011; No. 61/451,730 filed on Mar. 11, 2011; No. 61/451,735 filed on Mar. 11, 2011; and No. 61/597,282, filed on Feb. 10, 2012, the entire contents of all which are incorporated by reference.

STATEMENT REGARDING FEDERALLY SPONSORED RESEARCH OR DEVELOPMENT

The invention described herein was made in part by employees of the United States Government and may be manufactured and used by or for the Government of the United States of America for governmental purposes without the payment of any royalties thereon or therefore.

FIELD OF THE INVENTION

The present invention relates to reduction in aircraft noise, and in particular to aircraft noise generated by the airframe of the aircraft during operation.

BACKGROUND OF THE INVENTION

One of the more important constraints to the continued growth of air traffic is the related concern regarding aircraft noise. This concern has resulted in increasingly stringent noise restrictions for airports. During aircraft take-off, the dominant aircraft noise source is generally the propulsion noise from the engines of the aircraft. During aircraft approach and landing, airframe noise becomes a prominent component on par with the engine noise. This airframe noise is caused by the interaction of the unsteady and typically turbulent airflow with the aircraft structures. The sound radiated from the side edge of a partial-span flap is one of the major contributors to airframe noise during aircraft approach and landing.

Acoustic liners have been used to absorb propulsion noise within aircraft engine nacelles. Acoustic liners with variable-depth chambers to achieve broadband noise attenuation have been known for some time.

BRIEF SUMMARY OF THE INVENTION

One aspect of the present invention is a flap of the type that is movably connected to an aircraft wing to provide control of an aircraft in flight. The flap includes a flap structure defining inboard and outboard ends, and forward and rearward portions in the form of leading and trailing edges extending between the inboard and outboard ends. The flap structure may be elongated or it may comprise a relatively short structure such as a flaperon. The elongated flap structure defines an upper side extending between the inboard and outboard ends and between the forward and rearward portions of the elongated flap structure. The upper side of the elongated flap structure generally faces upwardly in use, and the lower side generally faces downwardly in use. The inboard end defines an inwardly-facing inboard end surface, and the outboard end defines an outwardly-facing outboard end surface. The upper and lower sides define inboard and outboard end portions adjacent the inboard and outboard ends, respectively, that tend to experience significant local hydrodynamic fluctuations associated with the scrubbing of unsteady flow over the inboard and outboard end surfaces. These fluctuations tend to generate noise to form a noise source.

At least a portion of the inboard and/or outboard end surfaces, and/or the inboard and outboard end portions of the upper or lower side of the flap includes a substantially porous surface that is acoustically connected to chambers (or passageways) that are disposed within the elongated flap structure. Noise generated by the noise source enters the internal chambers through the openings, and a portion of that noise is absorbed to thereby reduce the amount of noise that would otherwise be transmitted to the surrounding environment. If the chambers are sufficiently small in diameter, are terminated within the flap structure, and are not allowed to communicate with other internal chambers, the structure forms a local-reacting liner. If the chambers are large in diameter, or are interconnected, the structure forms an extended-reacting liner. Thus, noise absorption is achieved via all of the conventional acoustic liner mechanisms (e.g. viscothermal losses within the chamber, vortex shedding). The impedance boundary condition present at the surface of the porous surface also provides a pressure-release condition that may reduce the local hydrodynamic fluctuations, thereby inhibiting the noise generation process.

These and other features, advantages, and objects of the present invention will be further understood and appreciated by those skilled in the art by reference to the following specification, claims, and appended drawings.

BRIEF DESCRIPTION OF THE DRAWINGS

FIG. 3 is a cross-sectional view taken along the line III-III; FIG. 1, showing one possible configuration of the acoustic chambers;

DETAILED DESCRIPTION OF EMBODIMENTS

Figure 1:
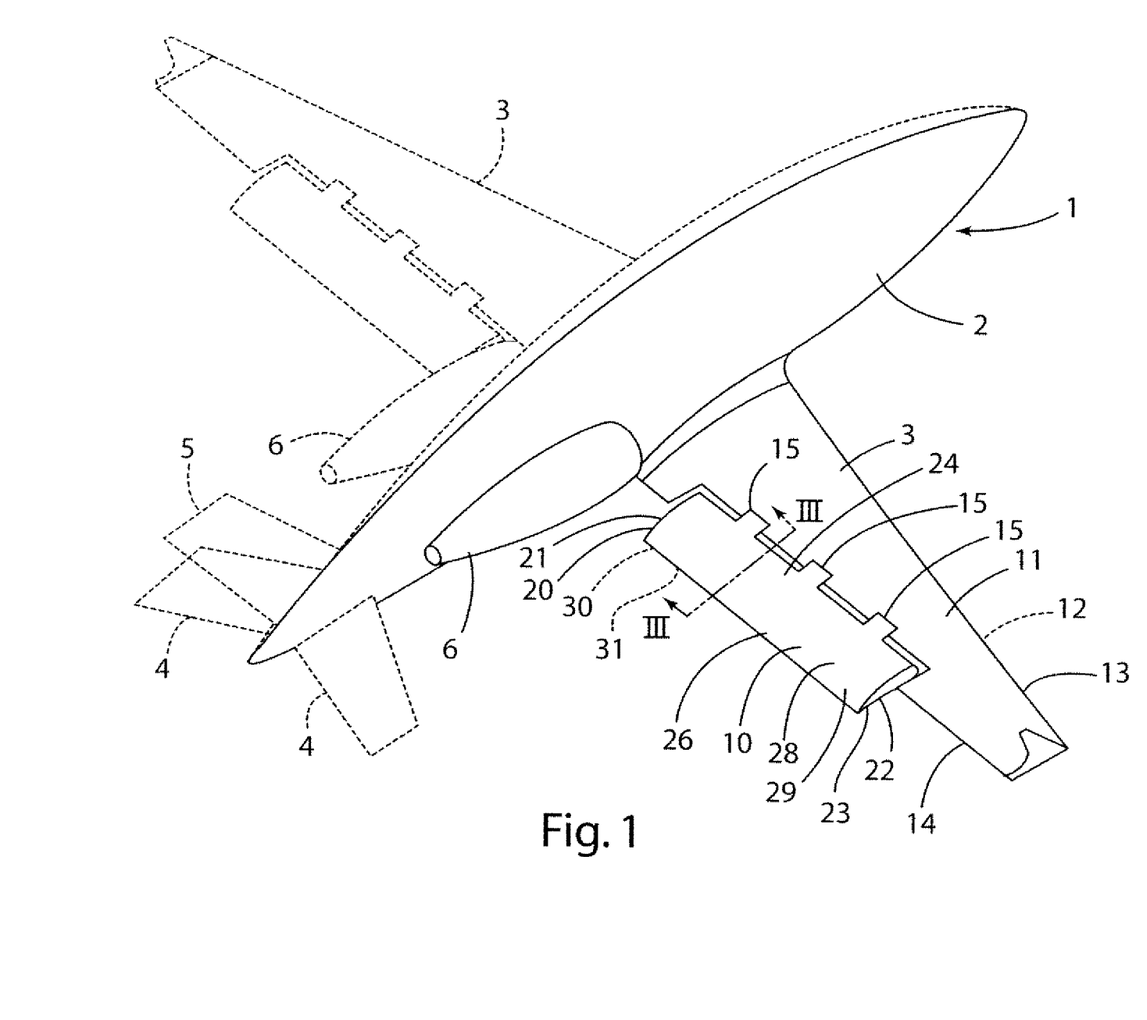
FIG. 1 is a partially fragmentary isometric view of an aircraft having wings and wing flaps.

For purposes of description herein, the terms "upper," "lower," "right," "left," "rear," "front," "vertical," "horizontal," and derivatives thereof shall be related to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Furthermore, references to specific items or features (e.g. a wing structure, leading edge slat, and slat cove filler) shall not be construed as limiting the item or feature to one-piece or multi-piece items or features. Hence, specific dimensions and other physical characteristics relating to the embodiments disclosed herein are not to be considered as limiting, unless the claims expressly state otherwise.

An aircraft 1 (FIG. 1) includes a fuselage 2, wings 3, and horizontal and vertical rear stabilizers 4 and 5, respectively. The aircraft 1 also includes turbofan engines 6 or other propulsion system such as open rotor engines. The fuselage 2, wings 3, stabilizers 4 and 5, and engines 6 may be of a known type, and these components of aircraft 1 will therefore not be described in more detail herein. The left half of aircraft 1 is shown in dashed lines in FIG. 1, but it will be understood that the left and right halves of aircraft 1 are mirror images of one another such that only the right half is described in detail herein.

Wing 3 may include upper and lower surfaces 11 and 12 extending between a leading edge 13 and a trailing edge 14. The aircraft may include an elongated flap structure 10 that is movably connected to the wing 3 adjacent rear edge 14. The flap 10 is movably interconnected with the wing 3 by connectors 15 to provide control of aircraft 1. In general, powered actuators (not shown) or the like may be utilized to provide movement of flap structure 10 relative to the wing 3. The connecting structures 15 and powered actuators may also be of a conventional type, and are not therefore described in detail herein.

The flap structure 10 includes inboard and outboard ends 20 and 22, respectively, and forward and rearward portions 24 and 26, respectively. The flap structure 10 further includes an upper side 2S having an upper surface 29 and a lower side 30 having a lower surface 31 (see also FIG. 3).

Wing design for conventional transport aircraft is driven largely by cruise efficiency, i.e., the need to generate adequate lift with minimal drag for level flight at high speeds. Conventional high-lift systems (leading-edge slats and trailing-edge flaps) are designed to augment lift and improve stall characteristics at the low landing speeds required under many circumstances. These multi-element airfoil systems increase the effective chord (streamwise dimension) of the wing and thus its effective area. The major effect of the multi-element airfoil arrangement is to generate a much larger pressure difference (lift) between the upper (suction) and lower (pressure) surfaces than would be possible utilizing a single airfoil element. However, the multi-element implementation of the high-lift system presents many discontinuities and other unfavorable geometric characteristics to the flow. These geometric features cause considerable unsteadiness in the flow, which is the primary source of aeroacoustic noise.

The principal geometric features responsible for producing flow unsteadiness around flap 10, and thus noise, are the inboard and outboard edges 21 and 23, respectively, at the inboard and outboard ends 20 and 22, respectively. Computational results display strong suction peaks at the inboard and outboard edges 21 and 23, respectively of flap 10. The suction peaks are attributed to the presence of strong stream-wise vortices. Existence of a strong pressure differential between the bottom and top surfaces of the flap results in the formation of a complex dual-vortex system. Specifically, near the flap leading edge, the boundary layer on the bottom surface separates at the sharp corner and rolls up to form a stronger of the two vortices. Similarly, the thin boundary layer on the side edge separates at the sharp top corner and forms what is initially the weaker of the two vortices. Both vortices gain strength and size along the flap chord because of the sustained generation of vorticity. Downstream of the flap mid-chord, the side vortex begins to interact and merge with the vortex on the top surface. Eventually, a single dominant stream-wise vortex is formed.

Considerable flow unsteadiness (noise sources) is produced during the shear layer roll up, vortex formation and vortex merging process as well as by the interaction of the vortices with the sharp corners at the flap edge. The multi-element airfoil reverts to a smooth single-element profile during the cruise phase of flight to reduce wing drag. In current practice, the multiple airfoil elements are nested together in a retracted position.

The present invention includes a method and structure that reduces this source of airframe noise without compromising cruise efficiency, lift, and stall characteristics at landing. As discussed in more detail below, one aspect of the present invention is the use of acoustic liners that are imbedded within the flap structure 10 to target the propagation phase of acoustic disturbances generated elsewhere. It also targets the very process of noise generation via interaction of the unsteady flow with the flap side edges 21 and 23. By limiting the control action to fluctuations within the flow, the gross aerodynamic characteristics are left unaltered and, hence, the expected aerodynamic penalty is small or none at all. However, the limited volume within the flap edge creates a significant packaging challenge. In addition, the broad frequency range (potentially greater than 3.5 octaves) to be attenuated creates additional challenges.

Known technology used in current commercial aircraft to reduce noise generated at the flap side edges involves implementation of "clean" configurations. Prior concepts include the application of fences, continuous moldline link, porous treatment, and brushes at the flap side edges. Given the critical functionality of aircraft flaps in the control of the aircraft, reconfiguration of this system may be problematic. The known concepts offer a range of noise reduction potentials, but they also have disadvantages ranging from weight penalties, parasitic drag penalties during cruise, and/or a loss of aerodynamic efficiency.

Figure 2:
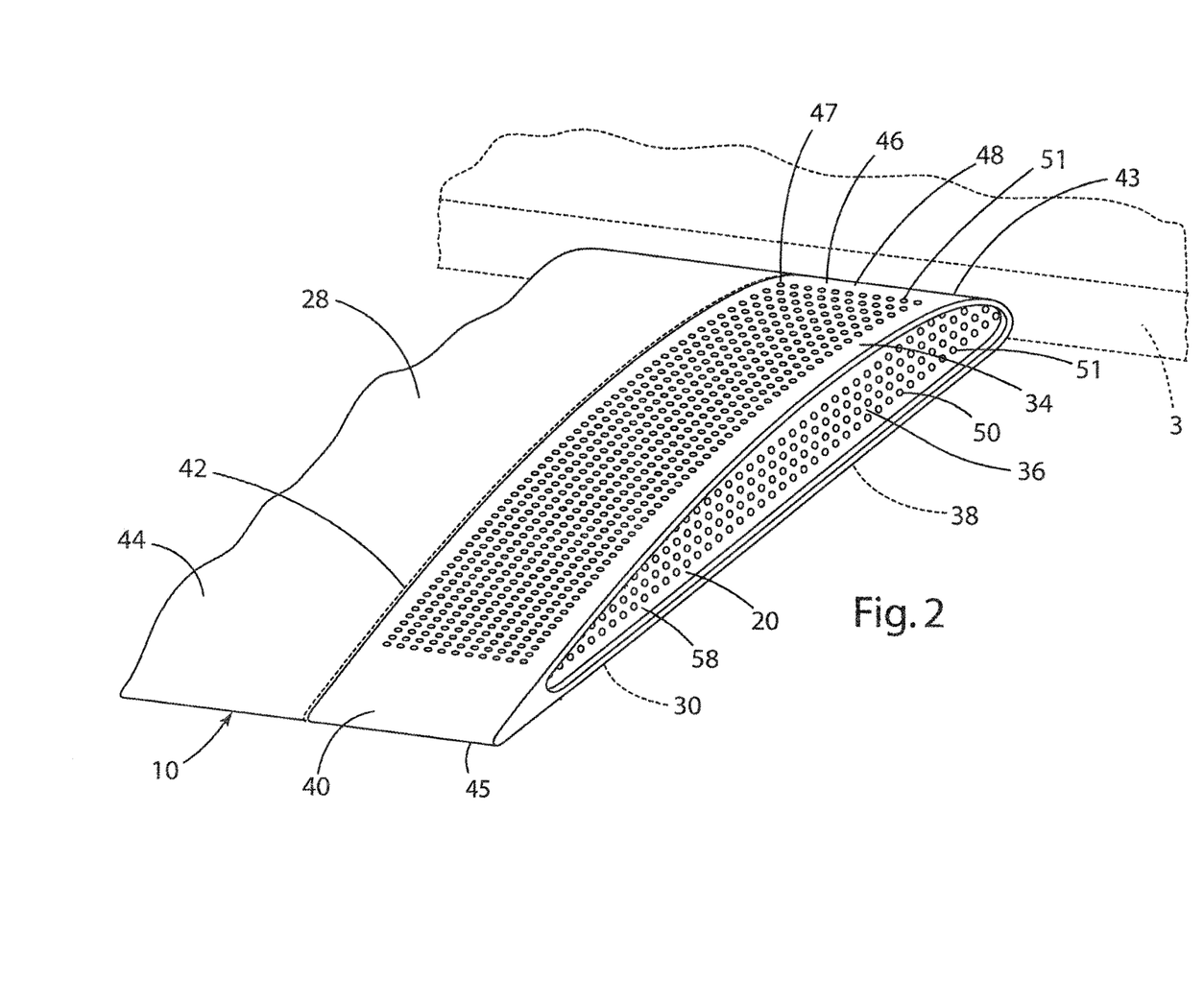
FIG. 2 is a partially fragmentary enlarged isometric view of a portion of the wing flap of the aircraft of FIG. 1.
Figure 4:
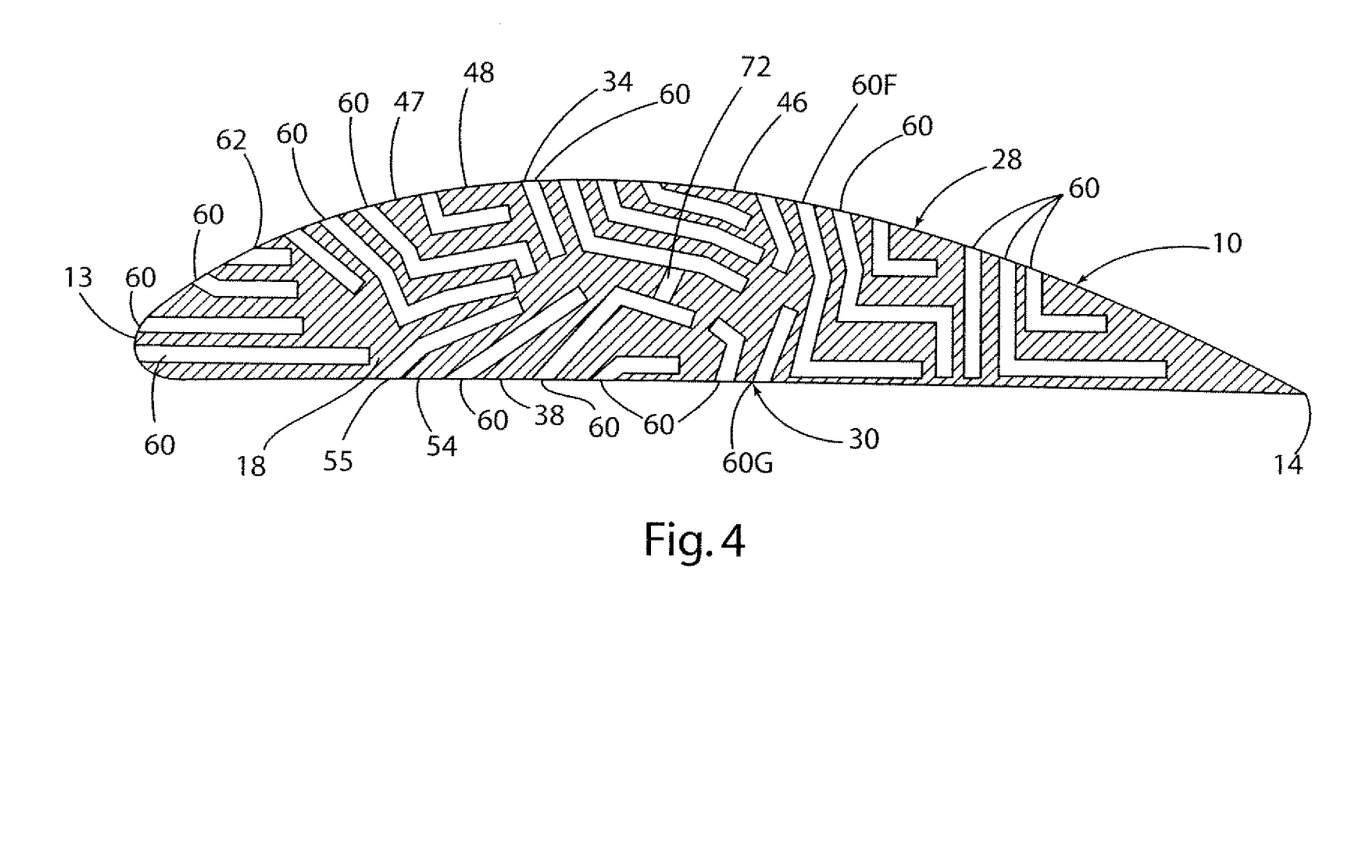
FIG. 4 is a cross-sectional view of a flap showing another possible configuration of the internal acoustic chambers.

With further reference to FIG. 2, a flap structure according to one aspect of the present invention includes an acoustic liner 34 on upper side 28 of flap 10 and/or an acoustic liner 36 on end 20 (or 22), and/or an acoustic liner 38 on a lower side 30 of flap 10 (see also FIG. 4). The end portion 40 of the flap 10 comprises the region of the flap at which unsteady flow generates noise. In FIG. 2, the end portion 40 is separated from a spanwise central portion 44 of flap 10 by a line designated 42. It will be understood, however, that the end portion 40 forming a source of noise does not necessarily have a clear boundary line 42, and the end portion 40 may have different sizes and shapes, with no distinct boundary relative to central portion 44 of flap structure 10. Also, the end portion 40 at which unsteady flow occurs may also change in width from the leading edge 43 to the trailing edge 45. Still further, the areas at the ends of flap 10 that experience unsteady flow may change as aircraft velocity, altitude, and other such operating parameters vary. In a typical commercial aircraft, the end portion 40 is approximately two to ten inches wide (measured from the end of flap 10).

The acoustic liner 34 comprises a thin sheet of material 46 having a plurality of perforations 47 arranged in a substantially uniform repeating pattern to thereby define a porous upper surface portion 48. The perforations 47 may also be arranged in a non-uniform pattern that may or may not be repeating. Porous upper surface 48 may be formed by a thin sheet of material having a plurality of perforations 51, or it may comprise a mesh, or it may be defined by the upper most surfaces of wing 3 adjacent to the openings of the internal chambers (or passageways) 60 (FIGS. 3 and 4) described in more detail below.

Similarly, acoustic liner 36 at end 22 (or end 20) may comprise a sheet of material 50 having a plurality of perforations 51 defining a porous outer surface 58. Surface 58 may be substantially planar, or it may be curved. In general, surface 58 may have a shape/contour that is substantially identical to the shape/contour of the original end surface of flap 10 for a particular aircraft as originally designed by an aircraft manufacturer. Alternately, surface 58 may be specifically contoured to optimize aerodynamics and/or noise reduction taking into account changes to airflow resulting from the presence of one or more acoustic liners according to the present invention. Similarly, acoustic liner 38 on the bottom 30 of flap 10 may comprise a thin sheet of material 54 having a plurality of perforations 55 that permit sound to enter acoustic internal chambers 60 formed in body 18 of flap structure 10. The flap 10 may include only a top acoustic liner 34, or it may include only an end acoustic liner 36, or only a bottom acoustic liner 38, or it may include any combination of the liners 34, 36, and 38, depending upon the requirements of a particular application. Also, the acoustic liners 34, 36, and 38 may cover substantially all of the upper and lower surfaces at end portion 40, or they may extend over only a segment of end portion 40 of flap structure 10. Similarly, the end acoustic liner 36 may cover substantially all of the end 20 (or 21), or it may cover only a portion thereof. The acoustic liners 34 and/or 36 and/or 38 are designed to absorb sound having a specific acoustic frequency profile, and to provide optimum aerodynamic characteristics.

Figure 3:
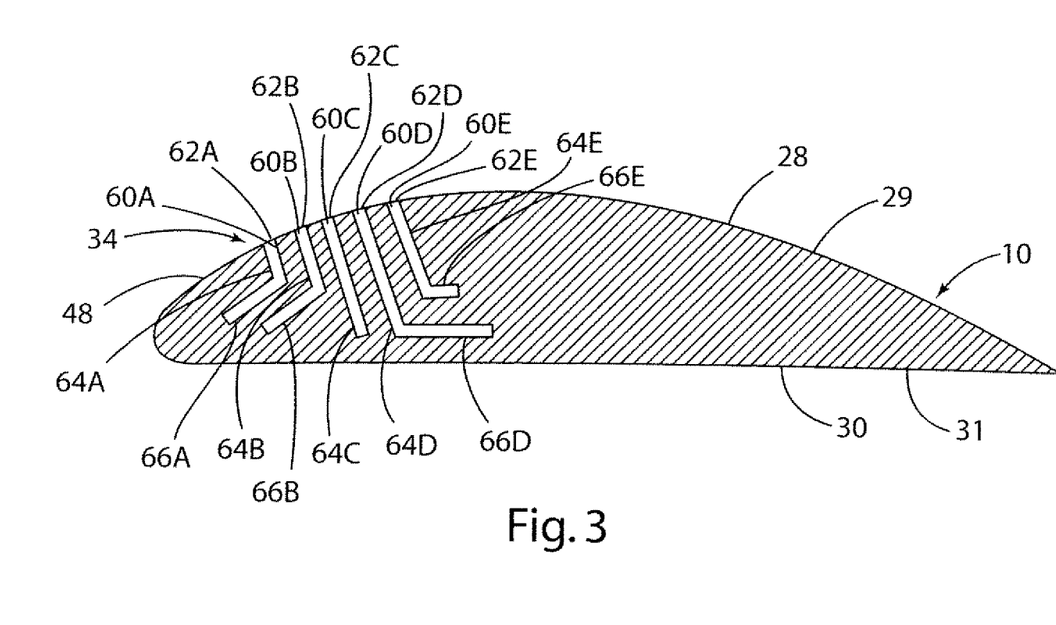

With further reference to FIG. 3, acoustic liner 34 on upper side 28 of flap 10 may comprise a plurality of internal acoustic chambers 60A-60E having openings 62A-62E at a porous upper surface 48 that form outer ends of chambers 60A-60E. In the liner 34 shown in FIG. 3, the acoustic chambers 60A-60E each include an outer portion 64A-64E, respectively, that extends inwardly in a direction that is generally transverse or perpendicular to porous upper surface 48. Also, chambers 60A and 60B have inner end portions 66A and 66B, respectively, that extend transverse relative to the outer portions 64A and 64B. A center chamber 60C, however, only includes a straight portion 64C. Acoustic chambers 60D and 60E also include inner, transversely-extending inner end portions 66D and 66E. The inner end portions generally extend at an angle in the range of about 30°-90° relative to outer portion 64A-64E. In general, the key constraint for the orientation of the internal chambers is the requirement that all of the chambers must fit within the volume 10 of the flap. The required chamber length can be realized utilizing straight, bent, L-shaped, or U-shaped configurations. The shape or combination of shapes chosen is dependent upon the lengths required to achieve optimal sound absorption (or pressure release) as well as the amount of volume available for the internal chambers. The acoustic chambers or passageways may have a uniform circular cross-sectional shape, or the cross-sectional shape may be quadrilateral of other geometry. For example, the cross-sectional shapes may be square, octagonal, hexagonal, diamond shaped, or irregularly shapes. The cross-sectional shape may be chosen to provide optimal use of the available internal space for a particular application. The cross-sectional area of the chambers/passageways may be substantially uniform along the length of the passageway, or it may increase or decrease. The specific orientations of the chambers 60 is typically not at all critical with respect to acoustic effects, and the orientation of the internal chambers 60 is largely driven by the need to fit the desired chamber lengths within the limited volume. The fact that most of the chambers 60 of FIG. 3 are nearly perpendicular to the surface at the surface was chosen to simplify the packaging requirement.

With further reference to FIG. 4, flap structure 10 may include a plurality of acoustic chambers 60, each having an opening 62. The acoustic chambers 60 may form an upper acoustic liner 34, a lower acoustic liner 38, and/or an end acoustic liner 36 (not shown in FIG. 4). Each of the acoustic chambers 60 may have a different length and/or shape to thereby absorb sound at different frequencies. Each chamber 60 may be configured to behave as a quarter-wavelength resonator (sometimes called an organ-pipe resonator). Thus, the different lengths of the chambers 60 are selected for optimal absorption of different frequencies. By proper selection of the combination of lengths (in a general sense, length is measured along the center line of the chamber, whether that is a straight path or it includes one or more bends), a broadband sound absorber can be achieved. Also, the chambers 60 within flap 10 (FIG. 4) may be connected by optional internal passageways 72, such that sound enters through the porous surfaces and travel in multiple directions within the flap 10. Chambers or passageways 60 may have opposite ends that are both open on either the upper surface or the lower surface of flap 10, or they may have one end that is open on the top side of flap 10, and an opposite end that is open on the bottom of flap 10. For example, the chambers 60F and 60G (FIG. 4) could comprise a single chamber extending all the way through flap 10 whereby noise is transmitted internally from the lower surface 12 of flap 10 to the upper surface 11 of flap 10, and/or visa-versa. Designing chambers or passageways 60 such that sound travels in multiple directions within the flap 10 via interconnecting passageways, and exits the flap 10 at a different portion of the porous surface represents one way to provide broadband sound absorption and/or dampening of hydrodynamic fluctuations (i.e. to reduce efficiency of their conversion to propagating sound).

The internal chambers 60 (or the entire flap interior) can also be filled with foam or other acoustic filler material, which changes the manner in which sound is absorbed as it travels through the flap 10.

The flap 10 may include a single internal chamber 60, a plurality of substantially identical internal chambers 60, or a plurality of internal chambers 60 having different lengths and/or shapes. If a number of variable-depth chambers, separated by impervious partitions and terminated within the body of the flap, are imbedded within the flap side edge 21 (or 23), a local-reacting liner results. In the configuration shown in FIG. 4, the internal chambers 60 (or channels) have a circular cross-sectional shape with relatively small diameters, such that a large number of the internal chambers 60 can fit within the relatively small volume of flap 10. According to other aspects of the present invention, the diameter of the interior chambers can be increased, with a porous face sheet covering the resultant openings at the porous surface to provide the desired acoustic resistance. A large number of configurations may be utilized to achieve similar surface acoustic impedance boundary conditions by varying the geometry of the internal chambers and the surface face sheet.

Figure 5:
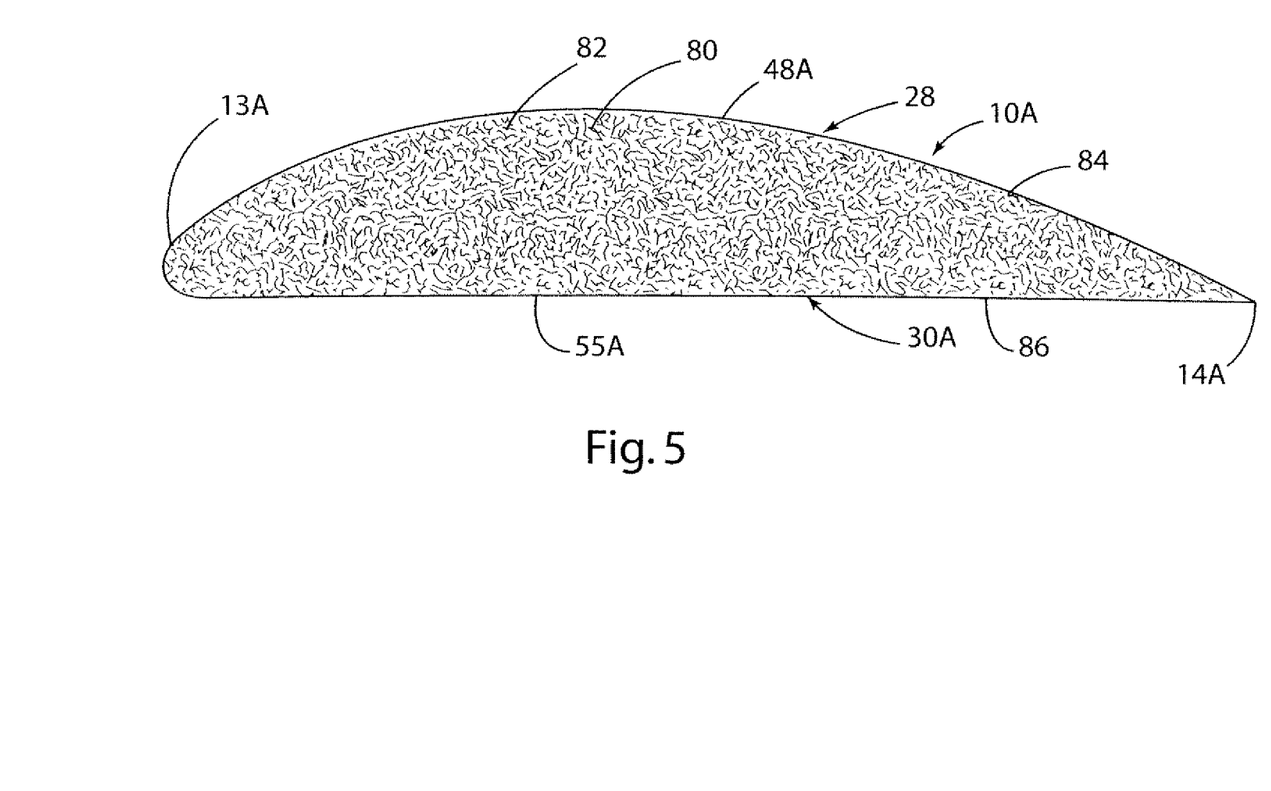
FIG. 5 is a cross-sectional view of a wing flap according to another aspect of the present invention.

With further reference to FIG. 5, a flap 10A according to another aspect of the present invention may include upper and lower surfaces 48A and 55A that are porous or have porous portions. Internal space 80 of flap 10A is partially or completely filled with filler material such as foam 82. Foam 82 may comprise metallic foam or other suitable material. The upper and lower surfaces 48A and 55A, respectively may comprise thin upper and lower sheets of material 84 and 86 having a plurality of perforations therethrough. Sheets of material 84 and 86 may be aluminum, fiber composites, or other suitable material.

The acoustic liners may also comprise extended-reaction liners. For example, the internal volume of the flap side edge 21 (or 23) may be filled with a bulk material such as foam, and allowing communication between the interior and exterior of the flap side edge via a porous surface such as a perforated face sheet, wire mesh, or the like.

Because of the porous nature of one or more segments of the flap surface near the side edge 21 (or 22), the aeroacoustic environment outside the flap 10 can communicate with the chamber or chambers 60 within the flap 10. As discussed above, the interior volume of the flap 10 contains one or more chambers 60, which may or may not be filled with sound-absorbent acoustic material such as a porous bulk material such as, but not limited to, foam or the like. The acoustic treatment imbedded within the volume of the flap 10 changes the boundary condition at the surface of the flap 10, such that the strength of the local hydrodynamic fluctuations associated with the scrubbing of the unsteady flow over the side edge surface is reduced. Furthermore, the change in the boundary condition also inhibits the conversion of hydrodynamic fluctuations into noise, and also inhibits near field propagation of this noise. The boundary condition presented at the porous surface is such that it inhibits sound from being generated by the flow interaction with this surface.

Software design tools are available to assist in the design of the interior chambers 60 of the flap 10. Known software previously utilized for design of acoustic liners in engine nacelles may be utilized to assist in the design of chambers 60. Such software may also be modified somewhat to thereby adapt it for use in designing chambers 60 in flap 10. The use of these design tools allows the efficient design of acoustic liners with multiple chambers, each of which can be designed with unique geometries. This design tool also allows a convenient evaluation of configurations designed to fit within a small volume, while exploring combinations of chambers that result in broadband noise reduction.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A flap of the type that is movably connected to an aircraft wing to provide control of an aircraft in flight, the flap comprising:
an elongated flap structure defining inboard and outboard ends and a leading edge and a trailing edge, the elongated flap structure further defining an upper side extending between the inboard and outboard ends and between the leading and trailing edges, and a lower side extending between the inboard and outboard ends and between the leading and trailing edges, wherein the upper side generally faces upwardly in use, and the lower side generally faces downwardly in use, and wherein the inboard end defines an inwardly-facing inboard end surface and the outboard end defines an outwardly-facing outboard end surface, and wherein the upper and lower sides define inboard and outboard end portions adjacent the inboard and outboard ends, respectively, that generate noise to form a noise source in use, and a spanwise central portion disposed on the upper and/or lower sides, extending between the inboard and outboard end portions and extending between the leading and trailing edges, wherein:
at least a portion of the inboard and outboard end portions of at least one of the upper and lower sides includes a substantially porous portion that is acoustically connected to at least one acoustic chamber disposed within the elongated flap structure, wherein the spanwise central portion of the flap structure is non-porous, and wherein at least a portion of the noise from the noise source enters the acoustic chamber through the porous portion and is absorbed within the flap structure.

2. The flap of claim 1, wherein:
the sheet of material is on the upper side of the elongated flap structure and has a gently curved convex outer surface.

3. The flap of claim 1, wherein:
at least two of the acoustic chambers have first portions that are separated by a partition having a generally uniform thickness whereby the first portions of the acoustic chambers extend generally parallel to one another.

4. The flap of claim 1, wherein:
a porous bulk material is disposed in at least a portion of at least one of the acoustic chambers.

5. The flap of claim 1, wherein:
the porous surface changes a boundary condition of flow around the flap structure and reduces the strength of local hydrodynamic fluctuations associated with the scrubbing of unsteady flow around the inboard and outboard ends of the flap structure.

6. The flap of claim 1, wherein:
the at least one acoustic chamber absorbs noise across a frequency range of at least about 3.5 octaves.

7. The flap of claim 1, further including
a porous portion is located on at least a portion of the inboard and outboard end surfaces.

8. The flap of claim 7, wherein:
each porous portion comprises a surface formed from a thin sheet of material having a plurality of perforations therethrough.

9. The flap of claim 8, wherein:
the perforations define a substantially uniform repeating pattern.

10. The flap of claim 1, wherein:
the at least one acoustic chamber includes at least two acoustic chambers, each acoustic chamber having outer ends having openings at the porous surface, and inner ends disposed within the elongated flap structure, the inner and outer ends of the acoustic chambers defining a length therebetween, and wherein:
a first one of the acoustic chambers has a first length, and a second one of the acoustic chambers has a second length that is significantly greater than the first length such that the first and second acoustic chambers tend to absorb sound having different frequencies.

11. The flap of claim 10, wherein:
at least one of the acoustic chambers has an outer portion that extends inwardly from the porous surface in a first direction that is transverse relative to the porous surface, and an inner portion that extends transversely relative to the first direction.

12. The flap of claim 10, wherein:
the acoustic chambers are defined by inner surfaces having one of a circular, quadrilateral, square, octagonal, hexagonal, diamond shaped, or irregular shape cross-sectional shape.

13. The flap of claim 10, wherein:
at least one of the acoustic chambers forms a quarter-wavelength resonator.

14. A flap of the type that is movably connected to an aircraft wing to provide control of an aircraft in flight, the flap comprising:
an elongated flap structure defining inboard and outboard ends and a leading edge and a trailing edge extending between the inboard and outboard ends, the elongated flap structure defining an upper side extending between the inboard and outboard ends and between the leading and trailing edges, and a lower side extending between the inboard and outboard ends and between the leading and trailing edges, wherein the upper side generally faces upwardly in use, and the lower side generally faces downwardly in use, and wherein the inboard end defines an inwardly-facing inboard end surface and the outboard end defines an outwardly-facing outboard end surface, and wherein the upper and lower sides define inboard and outboard end portions adjacent the inboard and outboard ends, and wherein:

the leading and trailing edges of at least one of the inboard and outboard end portions are non-porous and a central portion between said leading and trailing edges of said at least one of the inboard and outboard end portions includes a substantially porous portion that is acoustically connected to at least one acoustic chamber disposed within the elongated flap structure, and wherein at least a portion of the noise from the noise source enters the acoustic chamber through the porous portion and is absorbed within the flap structure.

15. The flap of claim 14, wherein said the leading and trailing edges of both of the inboard and outboard end portions are non-porous and the central portion of both of the inboard and outboard end portions includes a substantially porous portion that is acoustically connected to at least one acoustic chamber disposed within the elongated flap structure.

16. The flap of claim 14, further including a porous portion is located on at least a portion of the inboard and outboard end surfaces.

17. The flap of claim 14, wherein:
the porous portion comprises a surface formed from a thin sheet of material having a plurality of perforations therethrough.

18. The flap of claim 1, wherein a porous bulk material is disposed in at least a portion of at least one of the acoustic chambers.

19. A flap of the type that is movably connected to an aircraft wing to provide control of an aircraft in flight, the flap comprising:
an elongated flap structure defining inboard and outboard ends and a leading edge and a trailing edge extending between the inboard and outboard ends, the elongated flap structure defining an upper side extending between the inboard and outboard ends and between the leading and trailing edges, and a lower side extending between the inboard and outboard ends and between the leading and trailing edges, wherein the upper side generally faces upwardly in use, and the lower side generally faces downwardly in use, and wherein the inboard end defines an inwardly-facing inboard end surface and the outboard end defines an outwardly-facing outboard end surface, and wherein the upper and lower sides define inboard and outboard end portions adjacent the inboard and outboard ends, and wherein:
at least a portion of the inboard and outboard end surfaces includes a substantially porous portion that is acoustically connected to at least one acoustic chamber disposed within the elongated flap structure, and wherein at least a portion of the noise from the noise source enters the acoustic chamber through the porous portion and is absorbed within the flap structure.

20. The flap of claim 19, wherein:
a porous bulk material is disposed in at least a portion of at least one of the acoustic chambers.

* * * * *